(12) United States Patent
Takagi

(10) Patent No.: US 11,041,768 B2
(45) Date of Patent: Jun. 22, 2021

(54) PRESSURE-SENSITIVE SENSOR AND HAND

(71) Applicant: Seiko Epson Corporation, Tokyo (JP)

(72) Inventor: Fumio Takagi, Chino (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/665,300

(22) Filed: Oct. 28, 2019

(65) Prior Publication Data

US 2020/0132563 A1 Apr. 30, 2020

(30) Foreign Application Priority Data

Oct. 29, 2018 (JP) .............................. JP2018-203224

(51) Int. Cl.
| | |
|---|---|
| *G01L 1/22* | (2006.01) |
| *B25J 15/08* | (2006.01) |
| *G06F 3/041* | (2006.01) |
| *G06F 3/045* | (2006.01) |
| *G01L 9/06* | (2006.01) |
| *B25J 13/08* | (2006.01) |

(52) U.S. Cl.
CPC ............. *G01L 1/2287* (2013.01); *B25J 15/08* (2013.01); *B25J 13/082* (2013.01); *G01L 9/06* (2013.01); *G06F 3/045* (2013.01); *G06F 3/0414* (2013.01)

(58) Field of Classification Search
CPC ..... G06F 3/045; G06F 3/0414; G01L 1/2287; G01L 1/18; G01L 9/06; G01L 23/10; B25J 15/08; B25J 13/082
See application file for complete search history.

(56) References Cited

U.S. PATENT DOCUMENTS

| | | | | |
|---|---|---|---|---|
| 9,509,303 | B2* | 11/2016 | Suzuki | ............... H03K 17/9647 |
| 2007/0056385 | A1 | 3/2007 | Lorenz | |
| 2013/0338847 | A1* | 12/2013 | Lisseman | ................ G06F 3/045 |
| | | | | 700/301 |
| 2014/0267113 | A1* | 9/2014 | Lisseman | ............... G06F 3/0414 |
| | | | | 345/173 |
| 2015/0116073 | A1* | 4/2015 | Suzuki | ............... H03K 17/9647 |
| | | | | 338/47 |
| 2015/0277646 | A1* | 10/2015 | Ogura | ................... G06F 3/0414 |
| | | | | 345/173 |
| 2015/0277647 | A1 | 10/2015 | Ogura et al. | |
| 2017/0167928 | A1* | 6/2017 | Lee | ........................... G01L 1/20 |

(Continued)

FOREIGN PATENT DOCUMENTS

| | | |
|---|---|---|
| CN | 1813325 A | 8/2006 |
| CN | 207061866 U | 3/2018 |

(Continued)

*Primary Examiner* — Jonathan M Dunlap
(74) *Attorney, Agent, or Firm* — Harness, Dickey & Pierce, P.L.C.

(57) ABSTRACT

A pressure-sensitive sensor includes a first electrode, a second electrode, and a conductive resin located between the first electrode and the second electrode, wherein the conductive resin includes a first region, and a second region different from the first region in thickness in a direction in which the first electrode and the second electrode are arranged, and the second region surrounds the first region. Further, the thickness of the second region is thicker than the thickness of the first region. Further, a center of the first electrode is located within the first region in a plan view from the direction in which the first electrode and the second electrode are arranged.

10 Claims, 14 Drawing Sheets

(56) References Cited

U.S. PATENT DOCUMENTS

| | | | |
|---|---|---|---|
| 2018/0117772 A1 | | 5/2018 | Ikebe |
| 2018/0148323 A1 | * | 5/2018 | Ghidoni |
| 2019/0030732 A1 | * | 1/2019 | Kondoh ................ B25J 13/082 |
| 2019/0219461 A1 | * | 7/2019 | Nada .................... G01L 1/2293 |

FOREIGN PATENT DOCUMENTS

| | | |
|---|---|---|
| JP | 2015-197300 A | 11/2015 |
| JP | 2016-211875 A | 12/2016 |
| JP | 2017-096658 A | 6/2017 |
| JP | 2018-069385 A | 5/2018 |

* cited by examiner

PRESSURE-SENSITIVE SENSOR AND HAND

The present application is based on, and claims priority from, JP Application Serial Number 2018-203224, filed Oct. 29, 2018, the disclosure of which is hereby incorporated by reference herein in its entirety.

BACKGROUND

1. Technical Field

The present disclosure relates to a pressure-sensitive sensor and a hand.

2. Related Art

The pressure-sensitive sensor described in JP-A-2017-96658 (Document 1) has a substrate, a pressure-sensitive resistive element disposed on an upper surface of the substrate, and an electrode platform disposed on an upper surface of the pressure-sensitive resistive element. Here, with the purpose of making it possible to perform detection throughout a broad load range, regions different in thickness are arranged in a stripe pattern or a reticular pattern in the pressure-sensitive resistive element.

However, in the pressure-sensitive sensor described in Document 1, it is structurally difficult to achieve an improvement in measurement reproducibility in a high-load condition.

SUMMARY

A pressure-sensitive sensor according to an aspect of the present disclosure includes a first electrode, a second electrode, and a conductive resin located between the first electrode and the second electrode, wherein the conductive resin includes a first region, and a second region different from the first region in thickness in a direction in which the first electrode and the second electrode are arranged, and the second region surrounds the first region.

DESCRIPTION OF EXEMPLARY EMBODIMENTS

Hereinafter, a pressure-sensitive sensor and a hand according to the present disclosure will be described in detail based on some exemplary embodiments shown in the accompanying drawings.

First Embodiment

Figure 1:
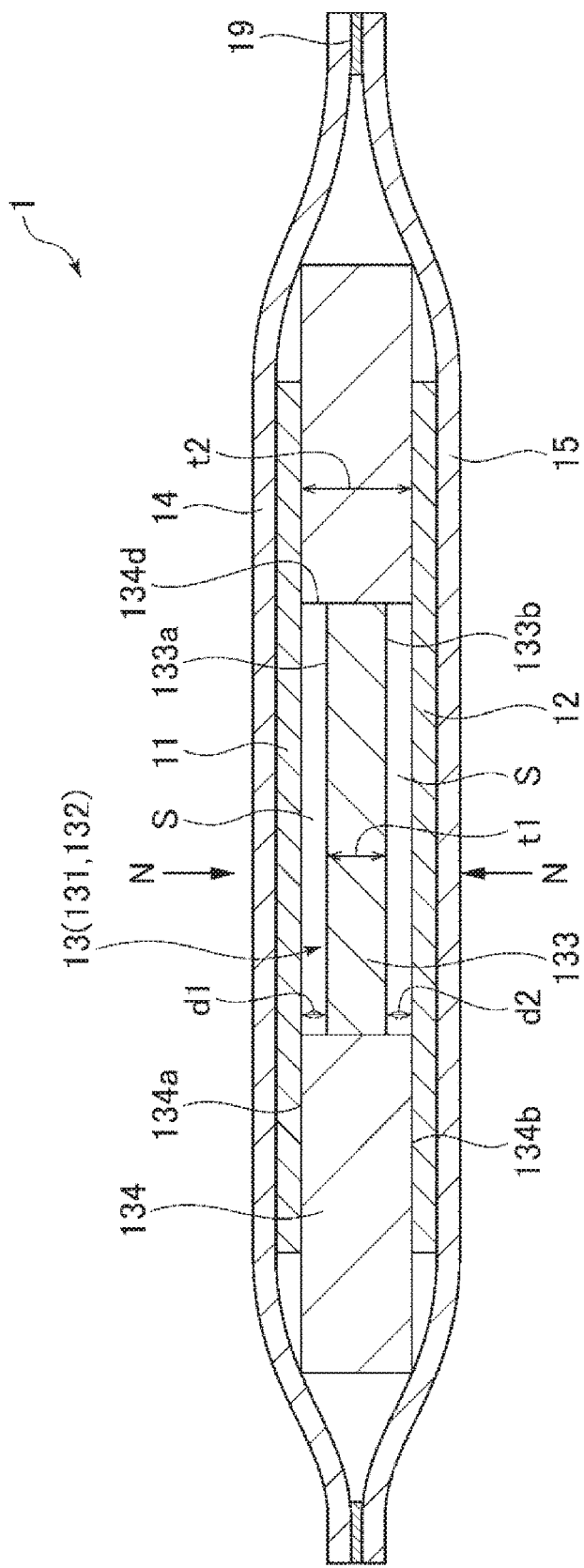
FIG. 1 is a cross-sectional view showing a pressure-sensitive sensor according to a first embodiment of the present disclosure.
Figure 2:
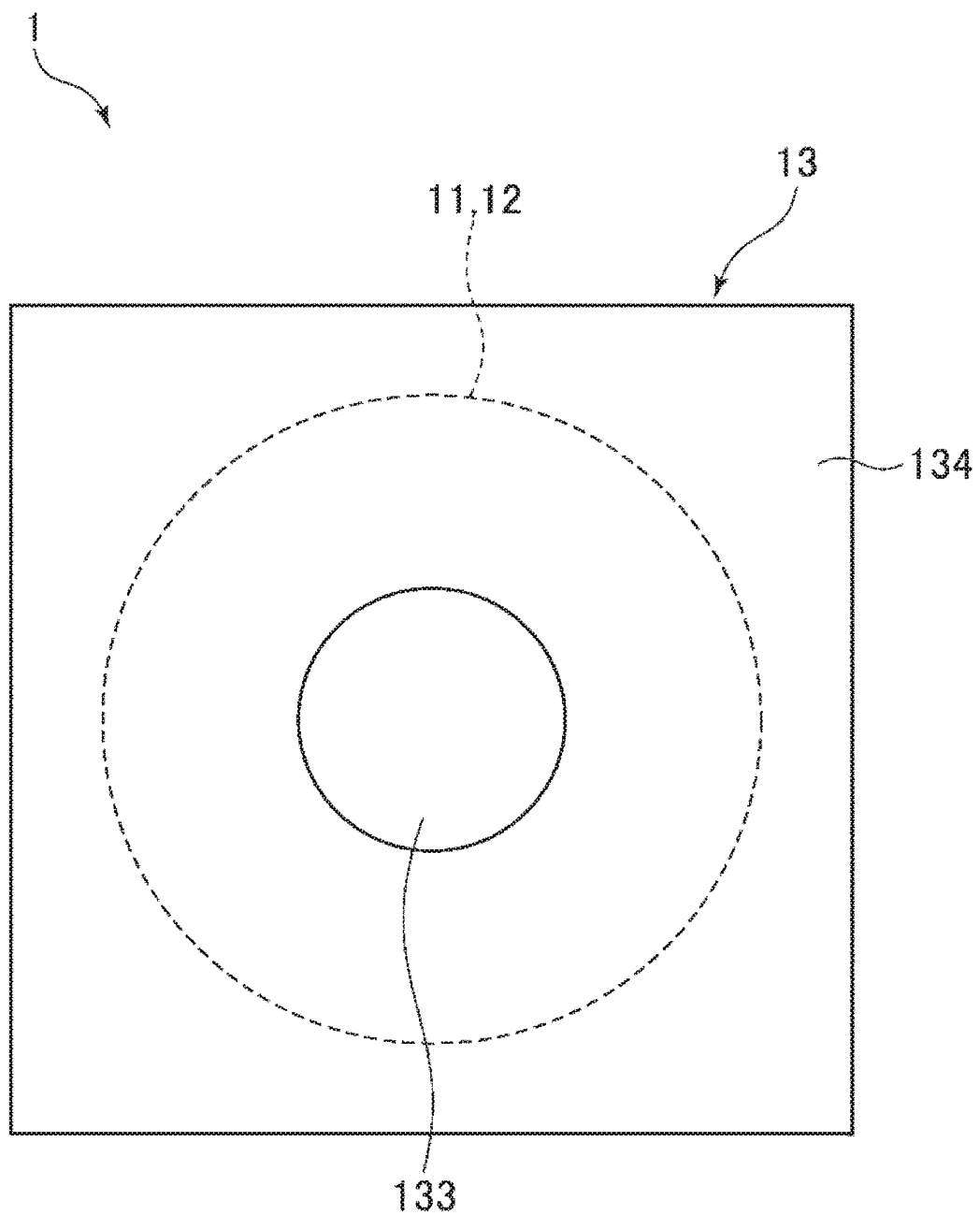
FIG. 2 is a plan view of the pressure-sensitive sensor shown in FIG. 1.

FIG. 1 is a cross-sectional view showing a pressure-sensitive sensor according to a first embodiment of the present disclosure. FIG. 2 is a plan view of the pressure-sensitive sensor shown in FIG. 1. It should be noted that the upper side of FIG. 1 is also referred to as an "upper side," and the lower side thereof is also referred to as a "lower side" in the following descriptions for the sake of convenience of explanation. Further, a direction in which a first electrode 11 and a second electrode 12 are arranged is also referred to as a "thickness direction," and a length of each section along the thickness direction is also referred to as a "thickness."

A pressure-sensitive sensor 1 shown in FIG. 1 has the first electrode 11, the second electrode 12, conductive resin 13, a first support sheet 14, and a second support sheet 15, wherein the second electrode 12 is disposed so as to be opposed to the first electrode 11, the conductive resin 13 is shaped like a sheet and is disposed between the first electrode 11 and the second electrode 12, the first support sheet 14 supports the first electrode 11, and the second support sheet 15 supports the second electrode 12. In the pressure-sensitive sensor 1 having such a configuration, when a load N along the thickness direction of the pressure-sensitive sensor 1 is applied to the pressure-sensitive sensor 1 due to a contact with an object, the contact areas between the first and second electrodes 11, 12 and the conductive resin 13 change, and accordingly, the resistance value between the first electrode 11 and the second electrode 12 changes. Therefore, it is possible for the pressure-sensitive sensor 1 to detect the load thus received based on the change in resistance value between the first electrode 11 and the second electrode 12. Hereinafter, each section of the pressure-sensitive sensor 1 will be described in sequence.

The conductive resin 13 is a resin mixture, and is formed of pressure-sensitive conductive resin including resin 131 functioning as a base and having an insulation property, and carbon nanotubes 132 as a conductive material. In other words, the conductive resin 13 is a mixture of the resin 131 and the carbon nanotubes 132, and is formed by kneading the carbon nanotubes 132 into the resin 131. According to such a configuration, it is possible to easily form the conductive resin 13 so as to be shaped like a sheet, and it is possible to achieve reduction in thickness and weight of the pressure-sensitive sensor 1. It should be noted that the conductive resin 13 can be manufactured by, for example, injection molding or extrusion molding.

By using the carbon nanotubes 132 as the conductive material, it becomes difficult for a volume resistivity of the conductive resin 13 to be affected by the temperature, and it is possible to reduce a variation in measurement value due to a temperature change. Therefore, for example, an excessive temperature correction is not required, and it is possible to accurately detect the load received. Further, by using the carbon nanotubes 132 as the conductive material, it is possible to sufficiently lower the resistance value (the electric resistance between the first electrode 11 and the second electrode 12) of the conductive resin 13 with a relatively small content compared to when using carbon as the conductive material. Therefore, it is possible to reduce the content of the carbon nanotubes 132, and the kneading with the resin 131 becomes easy. It should be noted that as the conductive material, there can be used, for example, carbon, or a variety of metal materials although not particularly limited.

The content of the carbon nanotubes 132 in the conductive resin 13 is preferably no lower than 2 wt % and no higher than 30 wt %, for example, more preferably no lower than 10 wt % and no higher than 30 wt %, and further more preferably no lower then 20 wt % and no higher than 25 wt % although not particularly limited. Thus, it is possible to provide moderate conductivity to the conductive resin 13. Further, the content of the carbon nanotubes 132 can sufficiently be suppressed, and it is possible to suppress a decrease in mechanical strength of the conductive resin 13.

Further, the diameter of the carbon nanotube 132 is preferably no smaller than 100 nm and no larger than 200 nm, for example, and more preferably no smaller than 130 nm and no larger than 160 nm, although not particularly limited. Further, the length of the carbon nanotube 132 is preferably no smaller than 2 µm and no larger than 10 µm, and more preferably no smaller than 3 µm and no larger than 8 µm although not particularly limited. By adopting the diameter and the length of such dimensions, it is possible to prevent aggregation of the carbon nanotubes to obtain a stable resistance value. Therefore, it is possible to more accurately detect the load applied to the pressure-sensitive sensor 1. It should be noted that the "diameter" described above is an average diameter of a plurality of carbon nanotubes 132 included in the conductive resin 13, and the "length" described above is an average length of the plurality of carbon nanotubes 132 included in the conductive resin 13.

Further, the resin 131 preferably has a deflection temperature under load of, for example, no lower than 100° C. although not particularly limited. It should be noted that the deflection temperature under load means a temperature at which an amount of deflection has a constant value after a process of raising the temperature of the sample in the state of applying a predetermined load, and it means that the higher the deflection temperature under load is, the higher heat resistance the sample has. Further, the deflection temperature under load can be measured using a testing method compliant with JIS 7191. Thus, it is possible to suppress the reduction in the elasticity of the conductive resin 13 under a high-temperature environment, and it is possible for the pressure-sensitive sensor 1 to exert substantially the same detection accuracy also under the high-temperature environment as that under a room-temperature environment or that under a low-temperature environment.

Further, the Young's modulus of the resin 131 is preferably no lower than 1 GPa, more preferably no lower than 1.5 GPa, and further more preferably no lower than 2 GPa although not particularly limited. Thus, since the conductive resin 13 becomes harder, it is possible to increase the mechanical strength of the pressure-sensitive sensor 1. Further, deformation or settling with time of the conductive resin 13 is suppressed, and it is possible to suppress degradation and fluctuation of the detection characteristic with time.

Further, as the resin 131, thermoplastic resin is preferably used, although not particularly limited. Thus, since it becomes easy to knead the resin 131 and the carbon nanotubes 132 with each other, and the dispersibility is also improved, it becomes easy to manufacture the conductive resin 13. As the thermoplastic resin, there can be cited, for example, ABS resin, polypropylene (PP), polyethylene (PE), polystyrene (PS), polymethylmethacrylate (PMMA), polyethylene terephthalate (PET), polyphenylene ether (PPE), polyamide (PA), polycarbonate (PC), polyacetal (POM), polybutylene terephthalate (PBT), polyphenylene sulfide (PPS), and polyether ether ketone (PEEK), and one of these materials or a mixture of two or more of these materials can be used although not particularly limited.

Among these, it is preferable for the resin 131 to include polycarbonate (PC). By the resin 131 including PC, it becomes also possible to knead the resin 131 low in price and easy to handle and the carbon nanotubes 132 with each other. Further, it is easy to harden the conductive resin 13. Therefore, the allowable load per unit area increases, and it is possible to increase the mechanical strength of the pressure-sensitive sensor 1, and at the same time, it is also possible to ensure a wide measurable range. Further, the deformation or the settling with time of the conductive resin 13 is suppressed, and it is possible to suppress the degradation and the fluctuation of the detection characteristic with time. It should be noted that the content of PC in the resin 131 is preferably no lower than 50 wt %, more preferably no lower than 75 wt %, and further more preferably no lower than 95 wt % although not particularly limited. Thus, the advantage described above can more remarkably be exerted.

Further, the Young's modulus of the conductive resin 13 is preferably no lower than 1.5 times and no higher than 2 times of, for example, the Young's modulus of the resin 131 although not particularly limited. Specifically, it is preferable for the Young's modulus of the conductive resin 13 to be, for example, no lower than 4 GPa and no higher than 6 GPa. Thus, the conductive resin 13 becomes sufficiently hard, and can therefore detect up to a higher load. Further, it is possible to prevent the conductive resin 13 from becoming excessively hard, and thus, it is possible to effectively prevent the detection characteristics from decreasing when the load is low.

The conductive resin 13 having such a configuration as described above has a first region 133 and a second region 134, wherein the first region 133 is located in a central part, and the second region 134 is disposed on the periphery of the first region 133, and surrounds the entire circumference of the first region 133. Further, as shown in FIG. 2, the first region 133 has a circular shape. As described above, by providing the first region 133 with the circular shape, it becomes easy to evenly apply the load to the entire area of the first region 133, and therefore, it is possible to accurately detect the load thus received in the whole of the conductive resin 13. It should be noted that the "circular shape" has meaning which includes a circular shape slightly out of a true circle and having a minute error which can occur in manufacturing, an oval shape, an elliptical shape, and so on besides the case of coinciding with a true circle.

Further, as shown in FIG. 1, defining the average thickness of the first region 133 as t1, and the average thickness of the second region 134 as t2, t1 and t2 are different from each other, and in the present embodiment, a relationship of t1<t2 is true. In such a configuration, in a natural state in which substantially no load is received, or a state in which the relatively small load is received, namely in a low-load state, the contact area between the first region 133 and the first electrode 11, and the contact area between the first region 133 and the second electrode 12 hardly change since gaps S exist between the first region 133 and the first electrode 11, and between the first region 133 and the second electrode 12, but the contact area between the second region 134 and the first electrode 11 and the contact area between the second region 134 and the second electrode 12 mainly change. In contrast, in a state in which a relatively high load is received, the gap S between the first region 133 and the first electrode 11 and the gap S between the first region 133 and the second electrode 12 vanish or decrease, and the contact area between the first region 133 and the first electrode 11, the contact area between the first region 133 and the second electrode 12, the contact area between the second region 134 and the first electrode 11, and the contact area between the second region 134 and the second electrode 12 change. As described above, by making the transition from the state (a first state) in which the contact area between the second region 134 and the first electrode 11 and the contact area between the second region 134 and the second electrode 12 change in accordance with an increase in load to the state (a second state) in which the contact area between the first region 133 and the first electrode 11, the contact area between the first region 133 and the second electrode 12, the contact area between the second region 134 and the first electrode 11, and the contact area between the second region 134 and the second electrode 12 change, the resistance variation particularly in the second state can be kept in a high level. Therefore, the measurement range on the high-load side broadens, and it is possible to obtain the pressure-sensitive sensor 1 capable of accurately detecting the load also on the high-load side, and at the same time, improving the detection reproducibility. It should be noted that in the low-load state, the first region 133 is not required to have contact with the first and second electrodes 11, 12, or can partially have contact with the first and second electrodes 11, 12 depending on the surface roughness thereof and so on.

In particular, in the present embodiment, since the relationship of t1<t2 is fulfilled, and the second region 134 located outside is made thicker than the first region 133 located inside, it becomes easy for the load to be evenly applied to the entire area of the conductive resin 13. Therefore, the advantage described above can more remarkably be exerted. It should be noted that this is not a limitation, and it is also possible to fulfill, for example, a relationship of t1>t2. Also by fulfilling such a relationship, it is possible to obtain the advantage described above exerted by fulfilling t1≠t2 similarly to the case of t1<t2.

Further, the first region 133 and the second region 134 are formed as separate bodies. In other words, by forming the second region 134 and the first region 133 separately from each other, and inserting the first region 133 into a through hole 134d formed at the center of the second region 134, the conductive resin 13 is formed. By forming the first region 133 and the second region 134 with the separate bodies as described above, it becomes easy to manufacture the conductive resin 13. It should be noted that this is not a limitation, and it is also possible for the first region 133 and the second region 134 to be formed integrally with each other.

It should be noted that the first region 133 and the second region 134 can be formed of the same material, or can also be formed of respective materials different from each other, but are preferably formed of the same material. Thus, the manufacture of the conductive resin 13 becomes easy and low in cost. Further, although in the present embodiment, the inner diameter of the through hole 134d and the outer diameter of the first region 133 roughly coincide with each other, and the outer circumferential surface of the first region 133 has contact with the inner circumferential surface of the through hole 134d, this is not a limitation, and it is also possible that the outer diameter of the first region 133 is smaller than the inner diameter of the through hole 134d, and the outer circumferential surface of the first region 133 is separated from the inner circumferential surface of the through hole 13d.

Further, the surface roughness Ra of the first region 133 and the second region 134 is preferably no larger than 5 µm, for example, and more preferably no larger than 3 µm, and further more preferably no larger than 2 µm, although not particularly limited. By adopting the surface roughness Ra of such a level, it is possible to make the first region 133 and the first electrode 11, the first region 133 and the second electrode 12, the second region 134 and the first electrode 11, and the second region 134 and the second electrode 12 moderately have contact with each other in the natural state, and it is possible to smoothly increase these contact areas in accordance with, for example, an increase in load. Therefore, it is possible to obtain the pressure-sensitive sensor 1 having a broader detection range and higher detection accuracy. Further, the surface roughness Ra of such a level can easily be realized by manufacturing the first and second regions 133, 134 using injection molding, extrusion molding, and so on. It should be noted that the first region 133 and the second region 134 can be the same in surface roughness Ra, or can also be different in surface roughness Ra from each other. Further, the upper surfaces 133a, 134a and the lower surfaces 133b, 134b can be the same in surface roughness Ra, or can also be different in surface roughness Ra from each other.

Further, the upper surface 133a of the first region 133 is located below the upper surface 134a of the second region 134, and the lower surface 133b of the first region 133 is located above the lower surface 134b of the second region 134. In other words, a step is formed between the upper surfaces 133a, 134a, and a step is also formed between the lower surfaces 133b, 134b. In particular, in the present embodiment, the center in the thickness direction of the first region 133 and the center in the thickness direction of the second region 134 are located on the same plane, and an average separation distance d1 between the upper surfaces 133a, 134a and an average separation distance d2 between the lower surfaces 133b, 134b are equal to each other. In other words, the relationship of d1≈d2, in particular the relationship of d1=d2 is fulfilled. Thus, the pressure-sensitive sensor 1 becomes to have a vertically symmetric shape, and it is possible to suppress a difference in detection characteristic by a direction of the arrangement. In other words, it is possible to exert substantially the same detection characteristic regardless of whether the pressure-sensitive sensor 1 is disposed so that the first support sheet 14 faces to the obverse side of the object, or the pressure-sensitive sensor 1 is disposed so that the second support sheet 15 faces to the obverse side of the object. Here, "equal" described above means to include when a difference between d1 and d2 is within ±5%.

It should be noted that this is not a limitation, and it is also possible to fulfill d1<d2 or d1>d2. When d1<d2 is fulfilled, for example, a step can be formed between the upper surfaces 133a, 134a, or the upper surfaces 133a, 134a can also be coplanar with each other. Similarly, when d1>d2 is fulfilled, for example, a step can be formed between the lower surfaces 133b, 134b, or the lower surfaces 133b, 134b can also be coplanar with each other. According also to such a configuration, it is possible to exert substantially the same advantages as those in the present embodiment.

The average separation distances d1, d2 are preferably larger than the surface roughness Ra of the first and second regions 133, 134 although not particularly limited. Specifically, as described above, when the surface roughness Ra is no larger than 5 μm, it is preferable to fulfill d1≥7 μm and d2≥7 μm, and it is more preferable to fulfill d1≥10 μm and d2≥10 μm. Thus, it is possible to prevent the step formed between the first region 133 and the second region 134 from being buried in the asperity of the surfaces of the first and second regions 133, 134, and the first region 133 from having excessive contact with the surfaces of the first and second electrodes 11, 12 in the natural state. Therefore, it is possible to more surely realize the pressure-sensitive sensor 1 which is wide in the measurement range on the high-load side, and is capable of accurately detecting the load also on the high-load side, and at the same time, improving the detection reproducibility. Here, the average separation distances d1, d2 can be calculated with (t2−t1)/2.

Further, the average thicknesses of the first region 133 and the second region 134 are preferably no smaller than 50 μm and no larger than 200 μm, for example, and more preferably no smaller than 80 μm and no larger than 120 μm, and further more preferably no smaller than 90 μm and no larger than 110 μm, although not particularly limited. Thus, there is obtained the conductive resin 13 which can sufficiently exert the function, and is sufficiently thin. Therefore, it is possible to achieve the reduction in size of the pressure-sensitive sensor 1 while keeping the detection characteristics of the pressure-sensitive sensor 1. It should be noted that it is possible to define each of the thicknesses t1, t2 as a thickness obtained by the measurement performed with a gauge: ϕ6.3 flat, a measuring force: no higher than 3.5 N using, for example, a "thickness gauge: No. 547-401 (dial gauge applied measurement instrument)" manufactured by Mitutoyo Corporation.

Further, each of the first and second regions 133, 134 preferably occupies no lower than 10% of the area sandwiched between the first electrode 11 and the second electrode 12, more preferably occupies no lower than 20%, and further more preferably occupies no lower than 30%. In other words, in the plan view from the thickness direction, the ratio between the area of the first region 133 and the area of the second region 134 in the area sandwiched between the first electrode 11 and the second electrode 12 is preferably in a range from 10:90 to 90:10, more preferably in a range from 20:80 to 80:20, and further more preferably in a range from 30:70 to 70:30. Thus, it is possible to prevent any of the areas of the first and second regions 133, 134 from becoming excessively small, and it is possible to more remarkably exert the advantages described above.

The conductive resin 13 is hereinabove described. In the present embodiment, although there is adopted a configuration in which the conductive resin 13 has the first region 133 and the second region 134 disposed on the periphery of the first region 133 as described above, this is not a limitation, and it is also possible to further have, for example, a third region disposed on the periphery of the second region 134, and a fourth region or more regions disposed on the periphery of the third region. Further, although in the present embodiment, the step formed between the first region 133 and the second region 134 vertically rises along the thickness direction, the step is not limited to this example, but can also be tilted with respect to the thickness direction, for example. In other words, it is also possible for the conductive resin 13 to have a taper part the thickness of which gradually decreases in a direction from the second region 134 toward the first region 133, between the second region 134 and the first region 133.

Further, the first electrode 11 and the second electrode 12 are arranged with a distance in the vertical direction in FIG. 1 so as to sandwich the conductive resin 13 therebetween. In the present embodiment, the first electrode 11 is disposed on the upper surface side of the conductive resin 13, and the second electrode 12 is disposed on the lower surface side. By adopting such an arrangement, since it is possible to arrange the first and second electrodes 11, 12 so as not to interfere with each other, the degree of freedom of the arrangement of the first and second electrodes 11, 12 can be increased. Further, each of the first and second electrodes 11, 12 can be formed to have a larger size. Further, since an electrical current flows in the thickness direction of the conductive resin 13, the current path is stabilized, and thus, it is possible to more accurately detect the load.

Further, the first electrode 11 is not bonded to, but has contact with the upper surface of the conductive resin 13, and the second electrode 12 is not bonded to, but has contact with the lower surface of the conductive resin 13. By keeping the first electrode 11 and the second electrode 12 from being bonded to the principal surface of the conductive resin 13 as described above, it becomes easy for the contact resistance between the first and second electrodes 11, 12 and the conductive resin 13 to change in accordance with the load.

Further, the first and second electrodes 11, 12 each have the circular shape, and are arranged concentrically with the first region 133 of the conductive resin 13 in the plan view from the thickness direction. In other words, in the plan view from the thickness direction, the center of each of the first and second electrodes 11, 12 is located inside the first region 133. Thus, it is possible to evenly dispose the conductive resin 13 between the first and second electrodes 11, 12. Therefore, the transition from the first state to the second state due to an increase in load becomes smooth, and there is obtained the pressure-sensitive sensor 1 having more excellent detection accuracy. It should be noted that this is not a limitation, and in the plan view from the thickness direction, it is also possible for the center of each of the first and second electrodes 11, 12 to be located outside the first region 133. Further, the shape of each of the first and second electrodes 11, 12 is not required to be the circular shape. Further, it is also possible for the shape of each of the first and second electrodes 11, 12 to be the same as, or different from each other.

The constituent material of the first electrode 11 and the second electrode 12 is not particularly limited as long as the conductivity is provided, and as the constituent material, there can be cited a variety of types of metal such as nickel (Ni), cobalt (Co), gold (Au), platinum (Pt), silver (Ag), copper (Cu), manganese (Mn), aluminum (Al), magnesium (Mg), titanium (Ti), and tungsten (W), and alloys including at least one species of these types of metal, and it is also possible to use one of these materials or a combination of two or more of these materials (as, e.g., a stacked structure).

Further, as shown in FIG. 1, the first support sheet 14 is located on the upper surface side of the first electrode 11. Further, the first electrode 11 is disposed on the lower surface of the first support sheet 14, and an interconnection not shown provided to the first support sheet 14 and the first electrode 11 are electrically coupled to each other. Thus, it is possible to easily extract the first electrode 11. It should be noted that the first support sheet 14 can also be omitted.

Similarly, the second support sheet 15 is located on the lower surface side of the second electrode 12. Further, the second electrode 12 is disposed on the upper surface of the second support sheet 15, and an interconnection not shown provided to the second support sheet 15 and the second electrode 12 are electrically coupled to each other. Thus, it is possible to easily extract the second electrode 12. It should be noted that the second support sheet 15 can also be omitted.

The first support sheet 14 and the second support sheet 15 described above are not particularly limited, and it is possible to use a variety of printed wiring boards such as a flexible printed wiring board or a rigid printed wiring board as the first support sheet 14 and the second support sheet 15. In the present embodiment, the first support sheet 14 and the second support sheet 15 are each formed of a flexible printed wiring board, and outer edge parts thereof are bonded to each other via an adhesive 19. Thus, the conductive resin 13 is sandwiched between the first support sheet 14 and the second support sheet 15 to thereby prevent disassembly of the pressure-sensitive sensor 1.

The pressure-sensitive sensor 1 is briefly described hereinabove. As described above, such a pressure-sensitive sensor 1 has the first electrode 11, the second electrode 12, and the conductive resin 13 located between the first electrode 11 and the second electrode 12. Further, the conductive resin 13 is provided with the first region 133, and the second region 134 different in thickness in the direction in which the first electrode 11 and the second electrode 12 are arranged, namely the vertical direction in FIG. 1. In other words, the thickness t1 of the first region 133 and the thickness t2 of the second region 134 are different from each other. Further, the second region 134 surrounds the first region 133. By adopting such a configuration, as described above, since there is made the transition from the first state in which the contact area between the second region 134 and the first electrode 11 and the contact area between the second region 134 and the second electrode 12 change in accordance with an increase in load to the second state in which the contact area between the first region 133 and the first electrode 11, the contact area between the first region 133 and the second electrode 12, the contact area between the second region 134 and the first electrode 11, and the contact area between the second region 134 and the second electrode 12 change, the resistance variation particularly in the second state can be kept in a high level. Therefore, the measurement range on the high-load side broadens, and it is possible to obtain the pressure-sensitive sensor 1 capable of accurately detecting the load also on the high-load side, and at the same time, improving the detection reproducibility.

Further, as described above, the thickness t2 of the second region 134 is thicker than the thickness t1 of the first region 133. In other words, the relationship of t2<t1 is fulfilled. Thus, since the second region 134 located outside becomes thicker than the first region 133 located inside, it becomes easy for the load to be evenly applied to the entire area of the conductive resin 13.

Further, as described above, in the plan view from the direction in which the first electrode 11 and the second electrode 12 are arranged, namely the thickness direction, the center of the first electrode 11 is located within the first region 133. Similarly, in the plan view from the thickness direction, the center of the second electrode 12 is located within the first region 133. Thus, it is possible to evenly dispose the conductive resin 13 between the first and second electrodes 11, 12. Therefore, the transition from the first state to the second state due to an increase in load becomes smooth, and there is obtained the pressure-sensitive sensor 1 having more excellent detection accuracy.

Further, as described above, the conductive resin 13 includes the carbon nanotubes 132. Thus, it becomes difficult for the volume resistivity of the conductive resin 13 to be affected by the temperature, and it is possible to reduce a variation in measurement value due to a temperature change. Therefore, for example, an excessive temperature correction is not required, and it is possible to accurately detect the load received.

Further, as described above, the first region 133 and the second region 134 are formed of the separate bodies. By forming the first region 133 and the second region 134 with the separate bodies as described above, it becomes easy to manufacture the conductive resin 13.

Further, as described above, in the plan view from the direction in which the first electrode 11 and the second electrode 12 are arranged, the shape of the first region 133 is a circular shape. By providing the first region 133 with the circular shape as described above, it becomes easy for the load to be evenly applied to the entire area of the first region 133. Therefore, the transition from the first state to the second state due to an increase in load becomes smooth, and there is obtained the pressure-sensitive sensor 1 having more excellent detection accuracy.

Further, as described above, the difference between the thickness t1 of the first region 133 and the thickness t2 of the second region 134 is larger than the surface roughness Ra of the first region 133 and the surface roughness Ra of the second region 134. Further, as described above, the step formed between the first region 133 and the second region 134 is larger than the surface roughness Ra of the first region 133 and the surface roughness Ra of the second region 134. In other words, the average separation distance d1 of the upper surfaces 133a, 134a is larger than the surface roughness Ra of the upper surfaces 133a, 134a, and the average separation distance d2 of the lower surfaces 133b, 134b is larger than the surface roughness Ra of the lower surfaces 133b, 134b. Thus, it is possible to prevent the step formed between the first region 133 and the second region 134 from being buried in the asperity of the surfaces of the first and second areas 133, 134, and the first region 133 from having excessive contact with the surfaces of the first and second electrodes 11, 12 in the natural state. Therefore, it is possible to more surely realize the pressure-sensitive sensor 1 which is wide in the measurement range on the high-load side, and is capable of accurately detecting the load also on the high-load side, and at the same time, improving the detection reproducibility.

Second Embodiment

Figure 3:
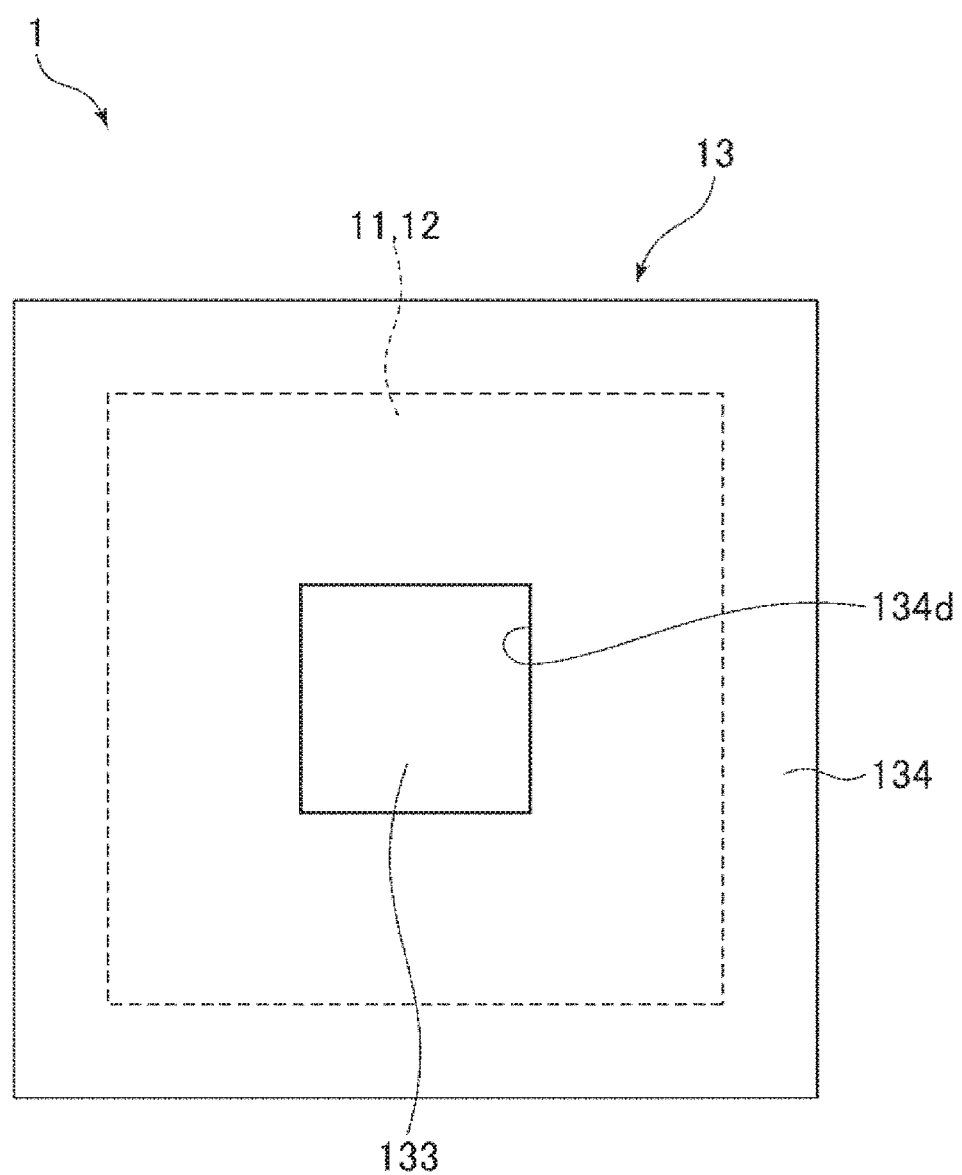
FIG. 3 is a plan view showing a pressure-sensitive sensor according to a second embodiment of the present disclosure.

FIG. 3 is a plan view showing a pressure-sensitive sensor according to a second embodiment of the present disclosure.

The pressure-sensitive sensor 1 according to the present embodiment is substantially the same as the pressure-sensitive sensor 1 according to the first embodiment described above except mainly the fact that the configuration of the first region 133 of the conductive resin 13 is different. In the following description, the pressure-sensitive sensor 1 according to the second embodiment will be described with a focus on the difference from the first embodiment described above, and the description of substantially the same issues will be omitted. Further, in FIG. 3, the constituents substantially the same as those of the first embodiment described above are denoted by the same reference symbols.

As shown in FIG. 3, in the plan view from the thickness direction, the shape of the first region 133 is a regular tetragonal shape (a square shape). In other words, in the plan view from the direction in which the first electrode 11 and the second electrode 12 are arranged, the shape of the first region 133 is a regular polygonal shape. By adopting such a shape, similarly to the first embodiment described above, it becomes easy for the load to be evenly applied to the entire area of the first region 133. Therefore, the transition from the first state to the second state due to an increase in load becomes smooth, and there is obtained the pressure-sensitive sensor 1 having more excellent detection accuracy. It should be noted that the shape of the first region 133 is not limited to the regular tetragonal shape as long as a regular polygonal shape is adopted, and can also be a regular triangular shape, a regular pentagonal shape, a regular hexagonal shape, or the like. Further, the "regular polygonal shape" described above means to include a shape slightly out of a regular polygonal shape due to, for example, a minute error which can occur in manufacturing in addition to those coinciding with the regular polygonal shape.

According also to such a second embodiment as described hereinabove, substantially the same advantages as in the first embodiment described above can be exerted.

Third Embodiment

Figure 4:
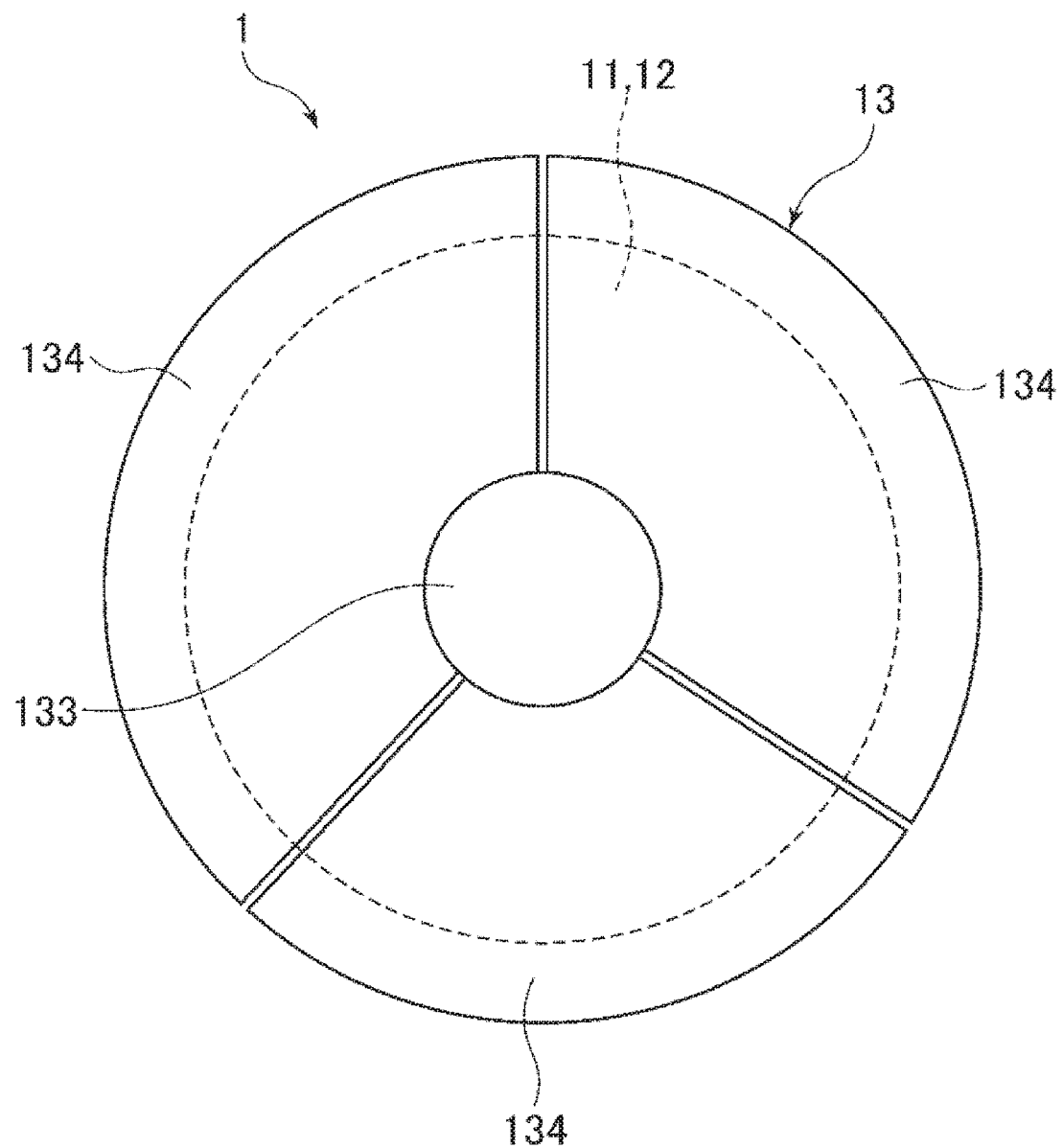
FIG. 4 is a plan view showing a pressure-sensitive sensor according to a third embodiment of the present disclosure.

FIG. 4 is a plan view showing a pressure-sensitive sensor according to a third embodiment of the present disclosure.

The pressure-sensitive sensor 1 according to the present embodiment is substantially the same as the pressure-sensitive sensor 1 according to the first embodiment described above except mainly the fact that the configuration of the second region 134 of the conductive resin 13 is different. In the following description, the pressure-sensitive sensor 1 according to the third embodiment will be described with a focus on the difference from the first embodiment described above, and the description of substantially the same issues will be omitted. Further, in FIG. 4, the constituents substantially the same as those of the first embodiment described above are denoted by the same reference symbols.

As shown in FIG. 4, there are three second regions 134 arranged along a circumferential direction of the first region 133. Further, the three second regions 134 are arranged at regular intervals in the circumferential direction of the first region 133, and are separated from each other. Also by arranging the plurality of second regions 134 on the periphery of the first region 133 as described above, in other words, providing the second region 134 with a configuration of surrounding only a part of the periphery of the first region 133, the measurement range on the high-load side broadens, and it is possible to obtain the pressure-sensitive sensor 1 capable of accurately detecting the load also on the high-load side, and at the same time, improving the detection reproducibility similarly to the first embodiment described above.

It should be noted that the number of the second regions 134 to be arranged on the periphery of the first region 133 is not particularly limited providing the number is no smaller than three, and can also be, for example, four, five, or six. Further, although in the present embodiment, the three second regions 134 are the same in shape as each other, this is not a limitation, and it is also possible for at least one of the second regions 134 to be different in shape from the other second regions 134. Further, although in the present embodiment, the three second regions 134 are arranged at the regular intervals, this is not a limitation, and it is also possible for the three second regions 134 to be arranged irregularly.

According also to such a third embodiment as described hereinabove, substantially the same advantages as in the first embodiment described above can be exerted.

Fourth Embodiment

Figure 5:
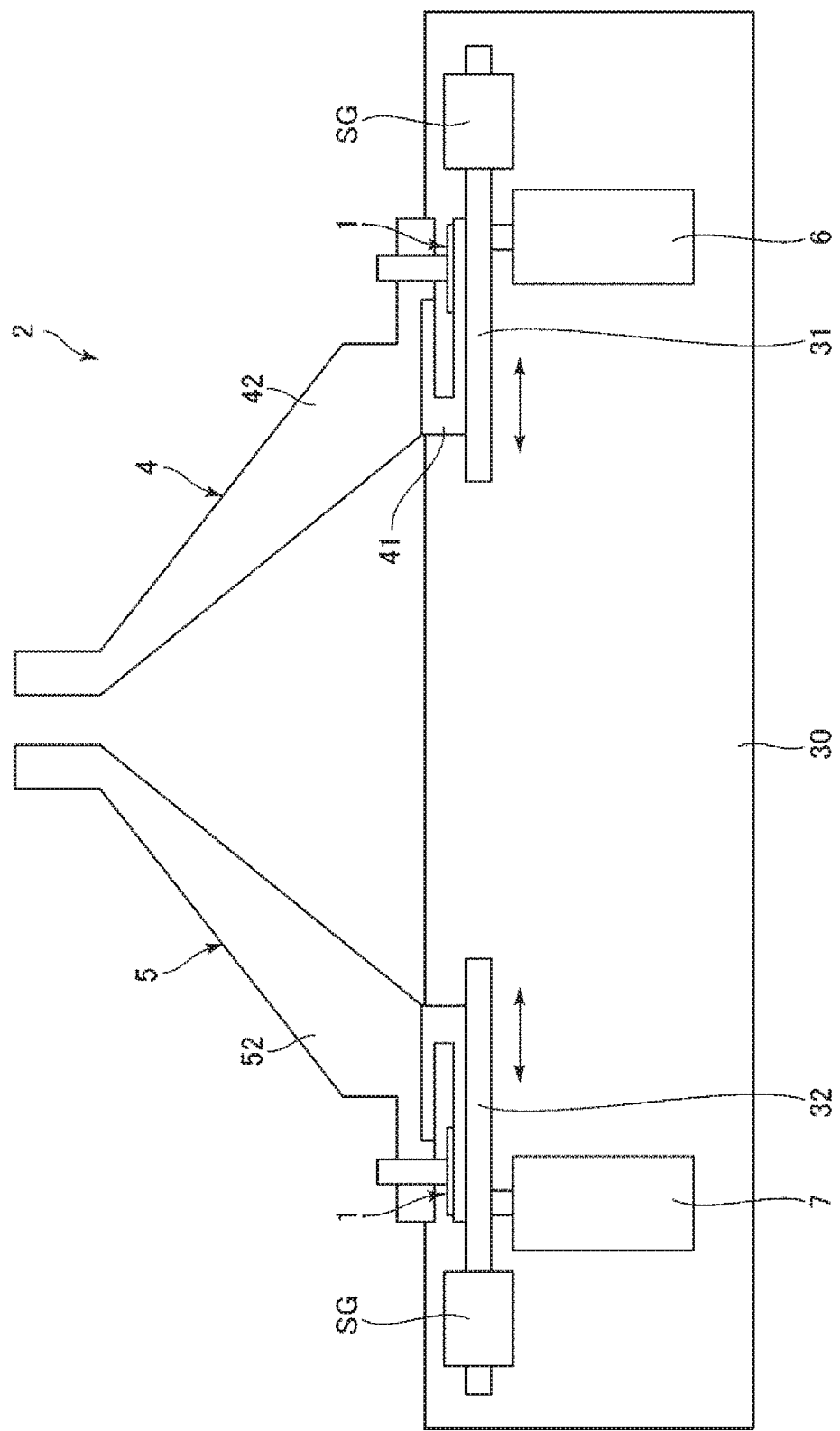
FIG. 5 is a plan view showing a hand according to a fourth embodiment of the present disclosure.
Figure 6:
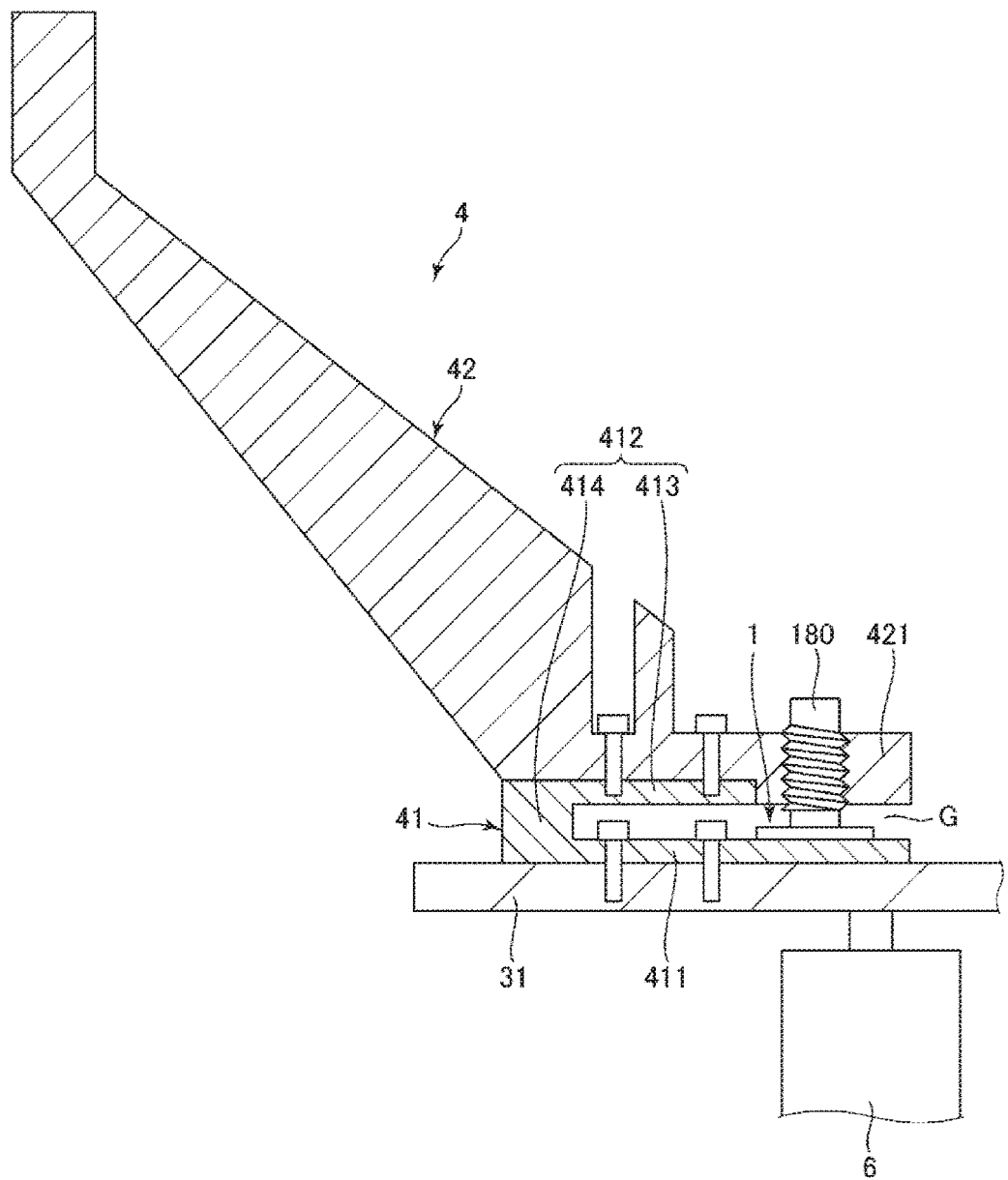
FIG. 6 is a cross-sectional view of a finger section provided to the hand shown in FIG. 5.
Figure 7:
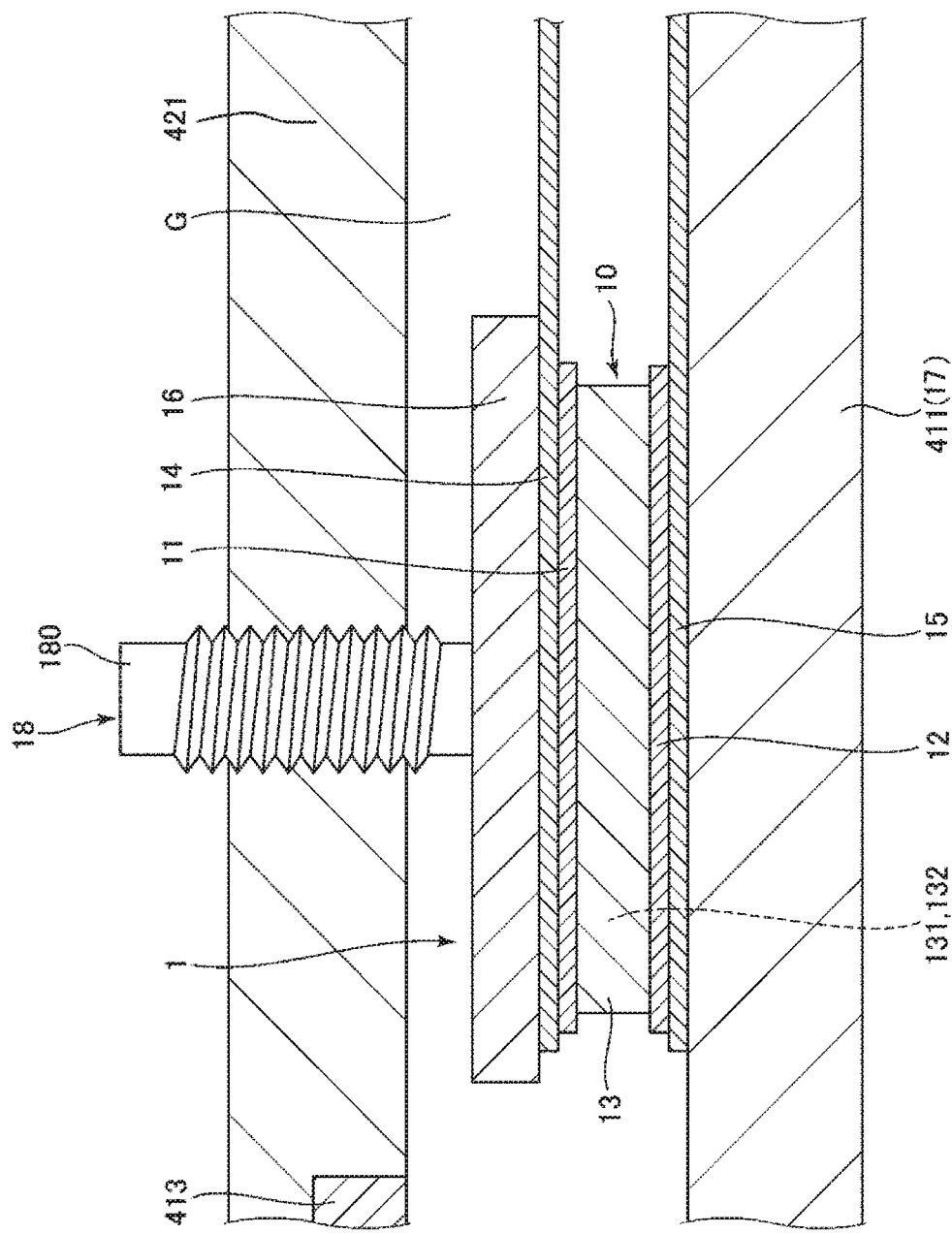
FIG. 7 is a cross-sectional view of a pressure-sensitive sensor disposed in the finger section shown in FIG. 6.
Figure 8:
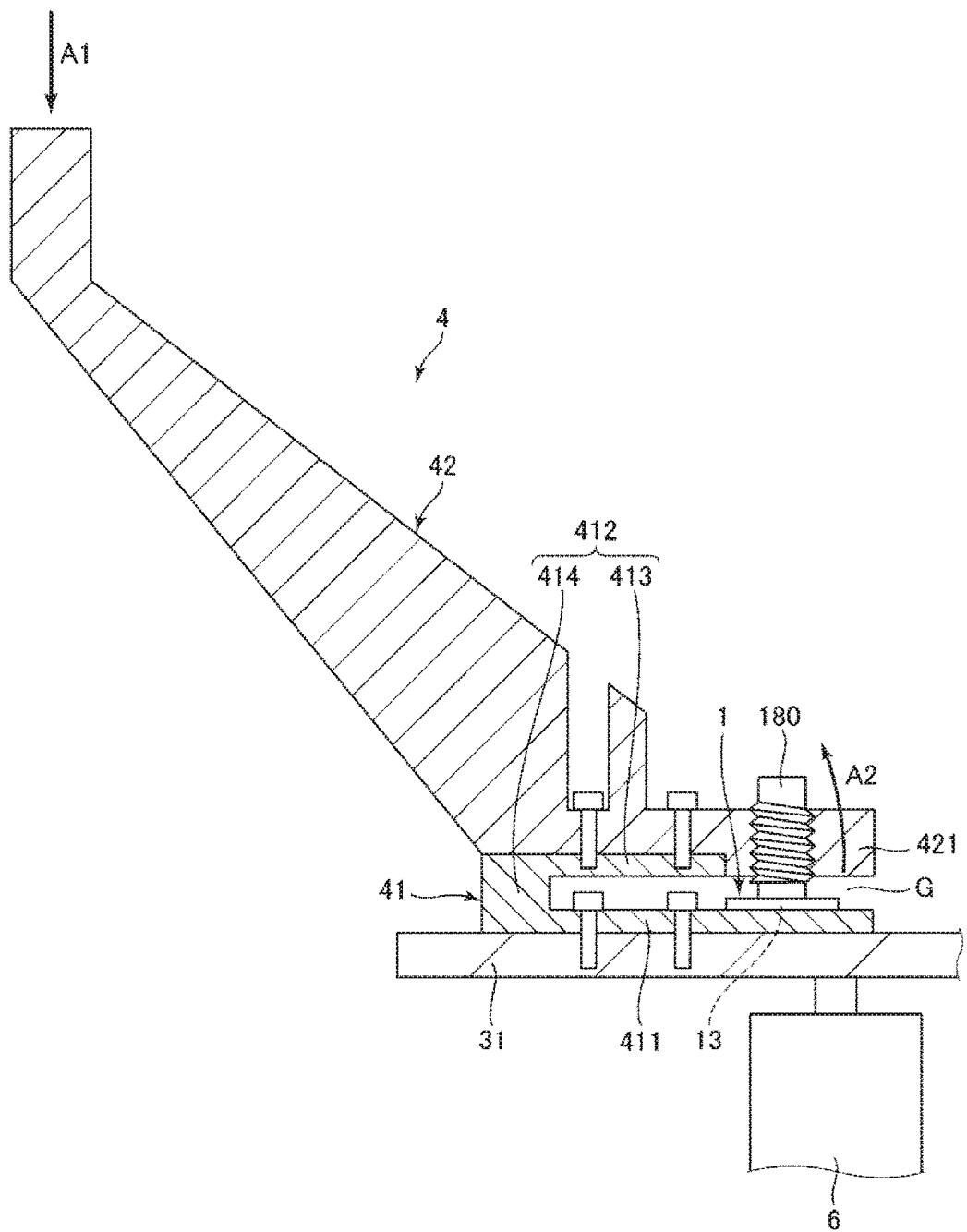
FIG. 8 is a cross-sectional view for explaining a mechanism of the pressure-sensitive sensor detecting a load.
Figure 9:
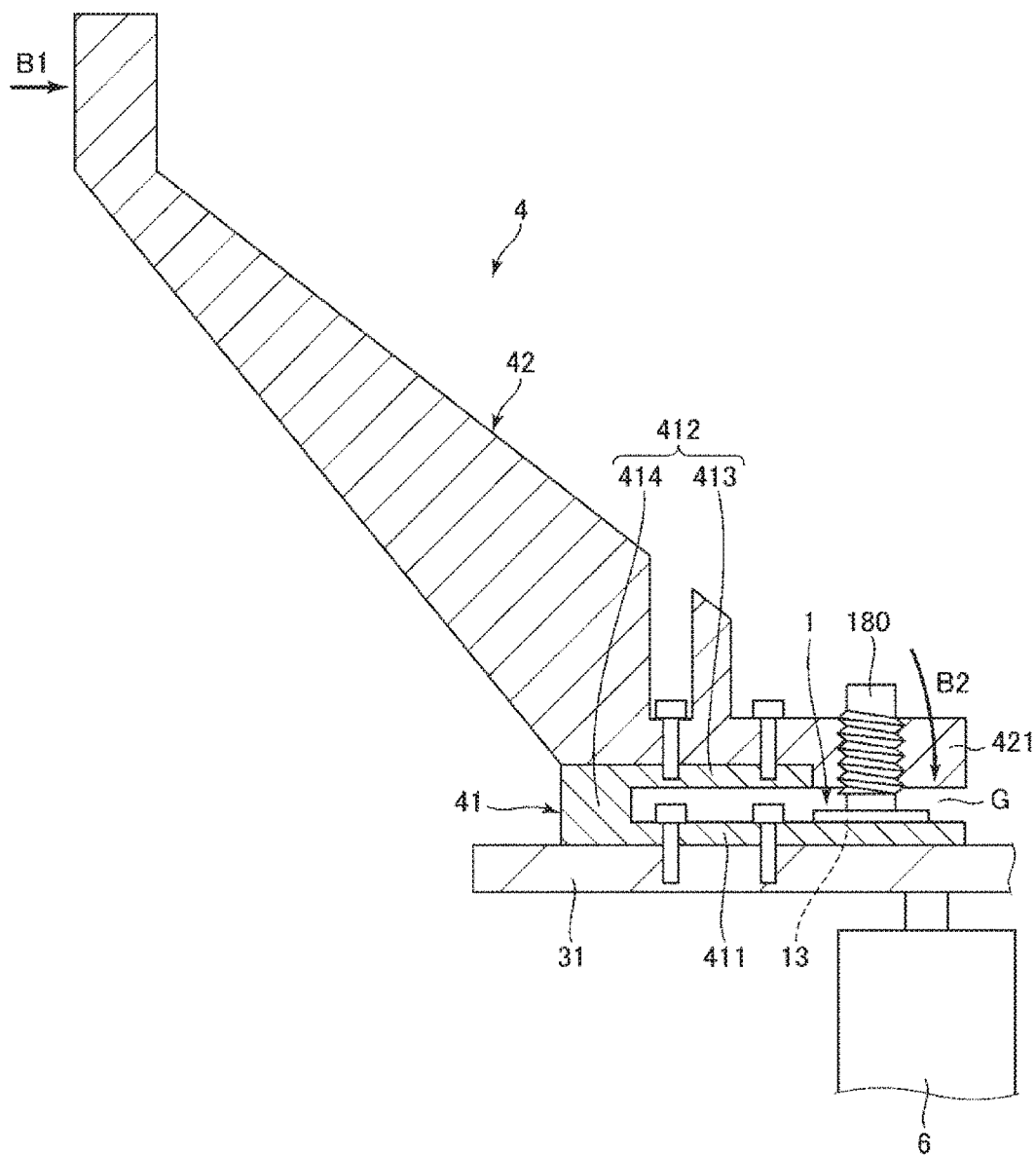
FIG. 9 is a cross-sectional view for explaining a mechanism of the pressure-sensitive sensor detecting a load.

FIG. 5 is a plan view showing a hand according to a fourth embodiment of the present disclosure. FIG. 6 is a cross-sectional view of a finger section provided to the hand shown in FIG. 5. FIG. 7 is a cross-sectional view of a pressure-sensitive sensor disposed in the finger section shown in FIG. 6. FIG. 8 and FIG. 9 are each a cross-sectional view for explaining a mechanism of the pressure-sensitive sensor detecting a load.

The hand 2 shown in FIG. 5 is a hand used in a state of being mounted on, for example, a robot, and capable of clamping an object from the both sides to grip the object. The hand 2 has a base 30, a pair of sliders 31, 32, finger sections 4, 5, and motors 6, 7, wherein the pair of sliders 31, 32 are slidably supported with respect to the base 30, the finger sections 4, 5 are fixed to the respective sliders 31, 32, and the motors 6, 7 slides the respective sliders 31, 32.

The sliders 31, 32 are each supported by the base 30 via a slide guide SG to thereby be made slidable in the arrow direction shown in the drawing with respect to the base 30. Further, the motor 6 is coupled to the slider 31, and the slider 31 slides due to the drive by the motor 6. Similarly, the motor 7 is coupled to the slider 32, and the slider 32 slides due to the drive by the motor 7. The motors 6, 7 are not particularly limited, but it is possible to use, for example, a piezoelectric motor as each of the motors 6, 7. By moving the sliders 31, 32 using the motors 6, 7 as described above, it is possible to grip the object with the finger sections 4, 5, or release the object gripped.

Although the finger sections 4, 5 are hereinafter described, since the finger sections 4, 5 are the same in configuration as each other, the finger section 4 will hereinafter be described as a representative, and the description of the finger section 5 will be omitted. As shown in FIG. 6, the finger section 4 has a fixation section 41 fixed to the slider 31, and a claw section 42 fixed to the fixation section 41. Further, the fixation section 41 has a base section 411 screwed to the slider 31, and a stress transmission section 412 coupled to the base section 411. Further, the stress transmission section 412 has a displacement section 413 disposed so as to be opposed to the base section 411 at a distance, and a coupling section 414 for coupling one end part of the displacement section 413 and the base section 411 to each other. It is arranged that when a stress is applied to the displacement section 413, the displacement section 413 is displaced with respect to the base section 411 around the coupling section 414 as a fulcrum. It should be noted that the fixation method of the fixation section 41 and the slider 31 is not limited to the screwing.

The claw section 42 is screwed to the displacement section 413, and obliquely extends toward the finger section 5. Further, the claw section 42 has a base part 421 opposed to the base section 411 with a gap G. Further, the pressure-sensitive sensor 1 is disposed between the base section 411 and the base part 421. It should be noted that the fixation method of the claw section 42 and the displacement section 413 is not limited to the screwing.

As shown in FIG. 7, the pressure-sensitive sensor 1 has a first substrate 16, a second substrate 17, the conductive resin 13, the first electrode 11, the first support sheet 14, the second electrode 12, the second support sheet 15, and a pressurizing section 18, wherein the second substrate 17 is disposed so as to be opposed to the first substrate 16, and also functions as the base section 411, the conductive resin 13 has a sheet-like shape, and is disposed between the first substrate 16 and the second substrate 17, the first electrode 11 is disposed between the first substrate 16 and the conductive resin 13, the first support sheet 14 is located between the first substrate 16 and the first electrode 11, the second electrode 12 is disposed between the second substrate 17 and the conductive resin 13, the second support sheet 15 is located between the second substrate 17 and the second electrode 12, and the pressurizing section 18 pressurizes a stacked body 10 as a stacked body of the first electrode 11, the conductive resin 13, and the second electrode 12.

The pressurizing section 18 has a screw 180, the screw 180 screws together with the base part 421 of the claw section 42, and by screwing in the screw 180, the first substrate 16 is pushed by a tip part of the screw 180, and thus, the stacked body 10 is pressurized. According to such a configuration, by adjusting a screw-in amount of the screw 180, it is possible to easily adjust the level of the pressure to the stacked body 10.

According to such a configuration, when a stress indicated by the arrow A1 is applied to the claw section 42 as shown in FIG. 8 such as when an action of pushing the object with the tips of the claw sections 42, 52 has been made, the displacement section 413 is displaced as indicated by the arrow A2 around the coupling section 414 as a fulcrum. Therefore, the gap G between the base section 411 and the base part 421 increases, and accordingly, the force applied to the conductive resin 13 decreases. On the other hand, when a stress indicated by the arrow B1 is applied to the claw section 42 as shown in FIG. 9 such as when an action of gripping the object with the claw sections 42, 52 has been made, the displacement section 413 is displaced as indicated by the arrow B2 around the coupling section 414 as a fulcrum. Therefore, the gap G between the base section 411 and the base part 421 decreases, and accordingly, the force applied to the conductive resin 13 increases. Therefore, according to such a configuration, it is possible to distinguish, for example, the force applied due to the action of pushing the object with the tips of the claw sections 42, 52 and the force applied due to the action of gripping the object with the claw sections 42, 52 from each other, and at the same time, it is possible to accurately detect these forces.

As described hereinabove, the hand 2 has the pressure-sensitive sensor 1. In other words, the hand 2 has the first electrode 11, the second electrode 12, and the conductive resin 13 located between the first electrode 11 and the second electrode 12. Further, the conductive resin 13 is provided with the first region 133, and the second region 134 different in thickness in the direction in which the first electrode 11 and the second electrode 12 are arranged. In other words, the thickness t1 of the first region 133 and the thickness t2 of the second region 134 are different from each other. Further, the second region 134 surrounds the first region 133. By adopting such a configuration, as described above, since there is made the transition from the first state in which the contact area between the second region 134 and the first electrode 11 and the contact area between the second region 134 and the second electrode 12 change in accordance with an increase in load to the second state in which the contact area between the first region 133 and the first electrode 11, the contact area between the first region 133 and the second electrode 12, the contact area between the second region 134 and the first electrode 11, and the contact area between the second region 134 and the second electrode 12 change, the resistance variation particularly in the second state can be kept in a high level. Therefore, the measurement range on the high-load side broadens, and it is possible to obtain the hand 2 capable of accurately detecting the load also on the high-load side, and at the same time, improving the detection reproducibility.

It should be noted that the configuration of the hand 2 is not particularly limited. For example, although in the hand 2 according to the present embodiment, the two finger sections 4, 5 are provided, the number of the finger sections is not limited thereto, and can also be one, or three or more. Further, although in the hand 2 according to the present embodiment, the finger sections 4, 5 each have the pressure-sensitive sensor 1, this is not a limitation, and it is possible to omit either one of the pressure-sensitive sensors 1. In other words, when a plurality of finger sections is provided, it is sufficient to dispose the pressure-sensitive sensor 1 in at least one of the finger sections. Further, although in the hand 2 according to the present embodiment, the pressure-sensitive sensors 1 are disposed in the finger sections 4, 5, the arrangement of the pressure-sensitive sensors 1 is not limited thereto, and it is possible to dispose the pressure-sensitive sensor 1 in, for example, the base 30.

Although the pressure-sensitive sensor and the hand according to the present disclosure are described hereinabove based on the illustrated embodiments, the present disclosure is not limited to these embodiments, but the constituents of each of the sections can be replaced with those having identical functions and arbitrary configurations. Further, it is also possible to add any other constituents to the present disclosure. Further, it is also possible to arbitrarily combine any of the embodiments with each other.

PRACTICAL EXAMPLES

Firstly, as described below, pressure-sensitive sensors according to a comparative example, and Practical Examples 1 through 3 were obtained.

Comparative Example

Conductive resin with the thickness of 100 μm was sandwiched between first and second electrodes to obtain a pressure-sensitive sensor.

Practical Example 1

Conductive resin having a second region with the thickness of 100 μm and a first region with the thickness of 90 μm was sandwiched between first and second electrodes to obtain a pressure-sensitive sensor. It should be noted that the first region had a circular shape, and the diameter thereof was 7 mm. Further, the first and second electrodes had circular shapes each concentrically arranged with the first region.

Practical Example 2

Substantially the same as Practical Example 1 is adopted except that the diameter of the first region is 8 mm.

Practical Example 3

Substantially the same as Practical Example 1 is adopted except that the diameter of the first region is 9 mm.

Figure 10:
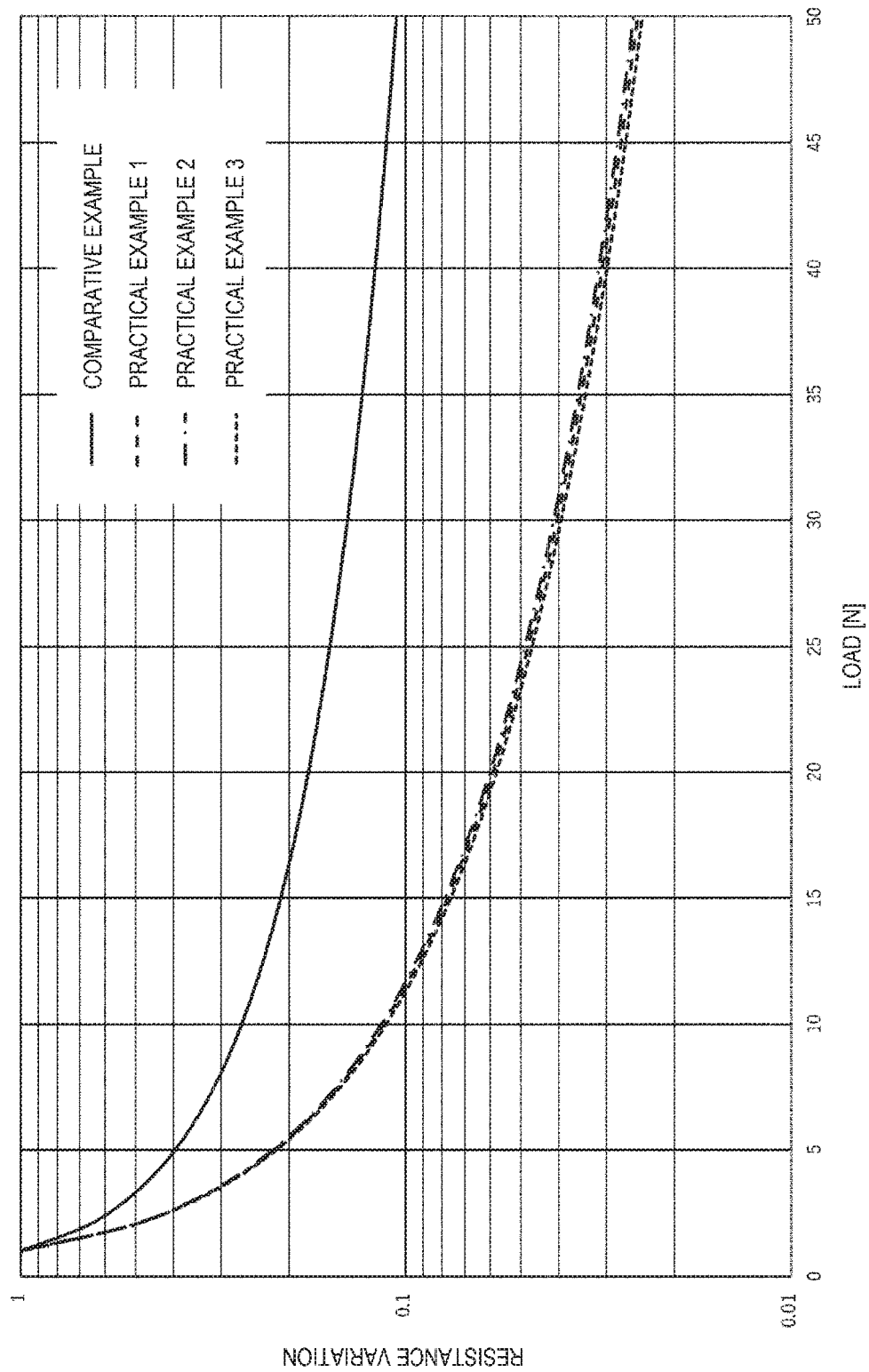
FIG. 10 is a graph showing a relationship between a load and a resistance variation.

Then, a relationship between a load and a resistance variation between the first and second electrodes is measured with respect to the comparative example and Practical Examples 1 through 3, and then the result is shown in FIG. 10 and Table 1 described below. It should be noted that the resistance variation is defined as a proportion of the change in resistance value when the load has increased tenfold, and can be calculated using the following formula based on an approximated power function. Specifically, defining the resistance value between the first and second electrodes as R, and the load as F, the approximated power function R can be expressed as $R=aF^b$ (where a and b are constants), and the resistance variation c can be expressed as $c=10^b-1$. As is understood from the drawing and the table, all of Practical Examples 1 through 3 are sufficiently high in resistance variation compared to the comparative example. Therefore, it is understood that as described above, the measurement range on the high-load side broadens, and it is possible to obtain the pressure-sensitive sensor capable of accurately detecting the load also on the high-load side, and at the same time, improving the detection reproducibility compared to the related art.

TABLE 1

|  | Diameter of first region | Resistance variation |
| --- | --- | --- |
| Comparative Example | — | −73.4% |
| Practical Example 1 | ϕ7 mm | −88.6% |
| Practical Example 2 | ϕ8 mm | −88.5% |
| Practical Example 3 | ϕ9 mm | −88.8% |

Then, as described below, pressure-sensitive sensors according to Practical Examples 4 through 7 were obtained.

Practical Example 4

Conductive resin having a second region with the thickness of 105 μm and a first region with the thickness of 90 μm was sandwiched between first and second electrodes to obtain a pressure-sensitive sensor. It should be noted that the first region had a circular shape, and the diameter thereof was 7 mm. Further, the first and second electrodes had circular shapes each concentrically arranged with the first region.

Practical Example 5

Substantially the same as Practical Example 4 is adopted except that the thickness of the first region is 95 μm.

Practical Example 6

Substantially the same as Practical Example 4 is adopted except that the thickness of the first region is 100 μm.

Practical Example 7

Substantially the same as Practical Example 4 is adopted except that the thickness of the first region is 110 μm.

Figure 11:
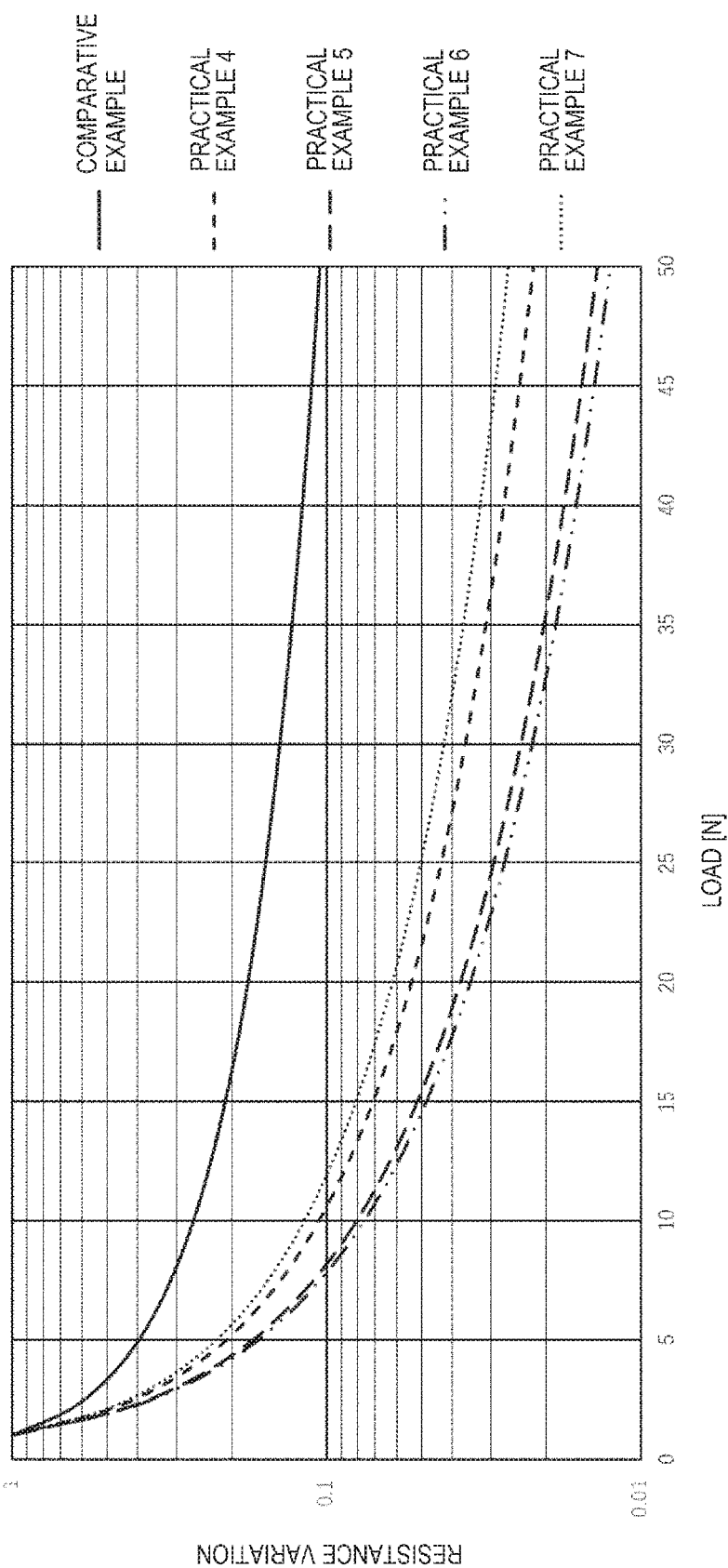
FIG. 11 is a graph showing a relationship between a load and a resistance variation.

Then, a relationship between a load and a resistance variation is measured with respect to the comparative example and Practical Examples 4 through 7, and then the result is shown in FIG. 11 and Table 2 described below. As is understood from the drawing and the table, all of Practical Examples 4 through 7 are sufficiently higher in resistance variation than the comparative example. Therefore, it is understood that as described above, the measurement range on the high-load side broadens, and it is possible to obtain the pressure-sensitive sensor capable of accurately detecting the load also on the high-load side, and at the same time, improving the detection reproducibility compared to the related art. It should be noted that the first region is thinner than the second region in Practical Examples 4 through 6, while in Practical Example 7, the first region is thicker than the second region. When comparing these with each other, Practical Examples 4 through 6 are higher in resistance variation than Practical Example 7. Therefore, it is understood that by making the first region thinner than the second region as in the configuration described above, the advantages described above become more conspicuous.

TABLE 2

|  | Thickness t1 of first region | Resistance variation |
| --- | --- | --- |
| Comparative Example | — | −73.4% |
| Practical Example 4 | 90 μm | −89.4% |
| Practical Example 5 | 95 μm | −91.9% |
| Practical Example 6 | 100 μm | −92.4% |
| Practical Example 7 | 110 μm | −88.2% |

Then, as described below, pressure-sensitive sensors according to Practical Examples 8 through 10 were obtained.

Practical Example 8

Conductive resin having a second region with the thickness of 100 μm and a first region with the thickness of 90 μm was sandwiched between first and second electrodes to obtain a pressure-sensitive sensor. It should be noted that the first region had a regular tetragonal (a square) shape, and the length on a side was 6 mm. Further, the first and second electrodes had regular tetragonal shapes each concentrically arranged with the first region, and the length on a side was 9 mm.

Practical Example 9

Substantially the same as Practical Example 8 is adopted except that the length on a side is 7 mm.

Practical Example 10

Substantially the same as Practical Example 8 is adopted except that the length on a side is 8 mm.

Figure 12:
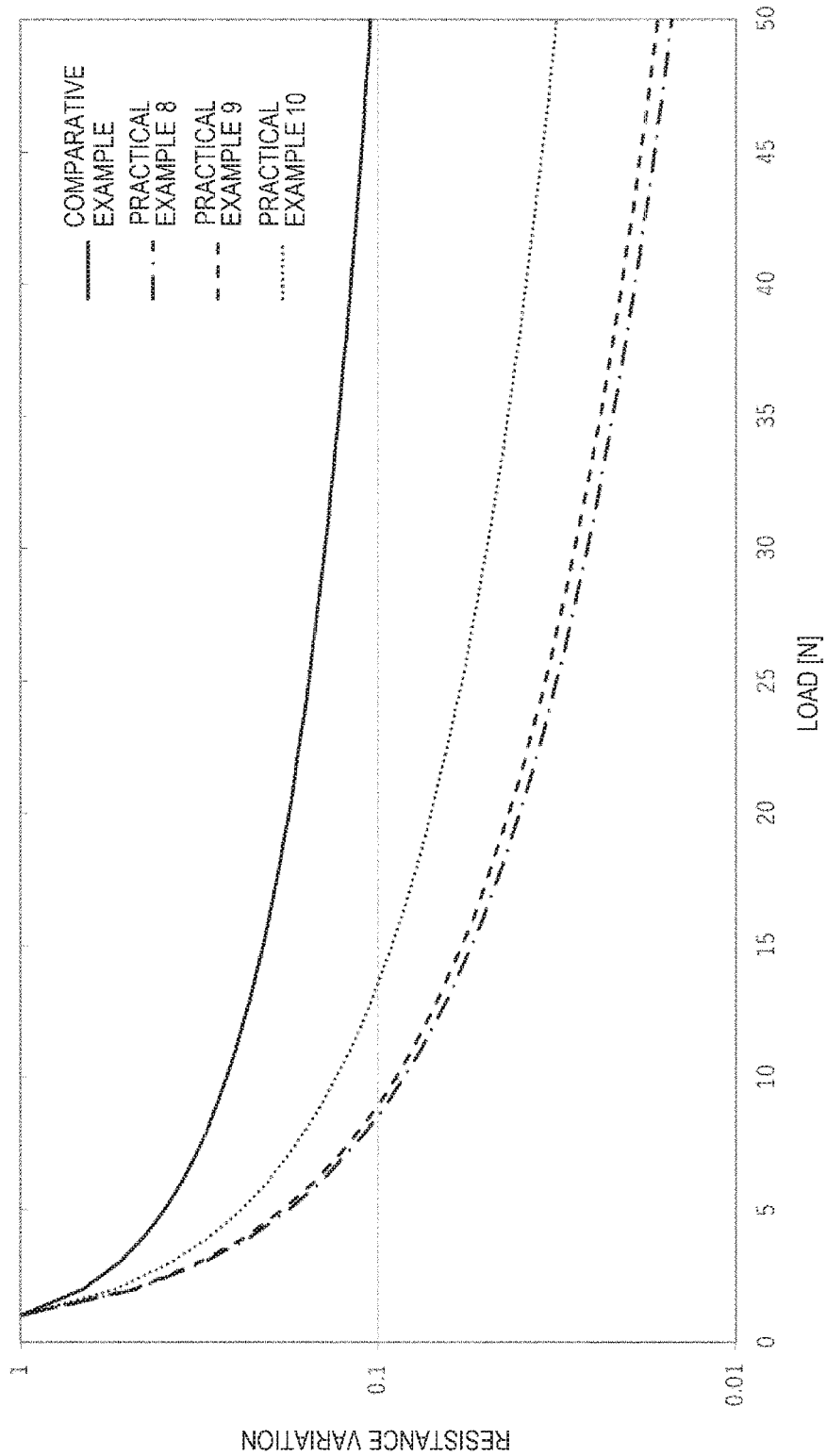
FIG. 12 is a graph showing a relationship between a load and a resistance variation.

Then, a relationship between a load and a resistance variation is measured with respect to the comparative example and Practical Examples 8 through 10, and then the result is shown in FIG. 12 and Table 3 described below. As is understood from the drawing and the table, all of Practical Examples 8 through 10 are sufficiently higher in resistance variation than the comparative example. Therefore, it is understood that as described above, the measurement range on the high-load side broadens, and it is possible to obtain the pressure-sensitive sensor capable of accurately detecting the load also on the high-load side, and at the same time, improving the detection reproducibility compared to the related art. Further, it is understood that substantially the same advantages as in the case of the circular shape can be obtained when the regular polygonal shape is adopted as the shape of the first region.

TABLE 3

| | Length on a side of first region | Resistance variation |
|---|---|---|
| Comparative Example | — | −73.4% |
| Practical Example 8 | 6 mm | −91.5% |
| Practical Example 9 | 7 mm | −91.1% |
| Practical Example 10 | 8 mm | −86.9% |

Figure 13:
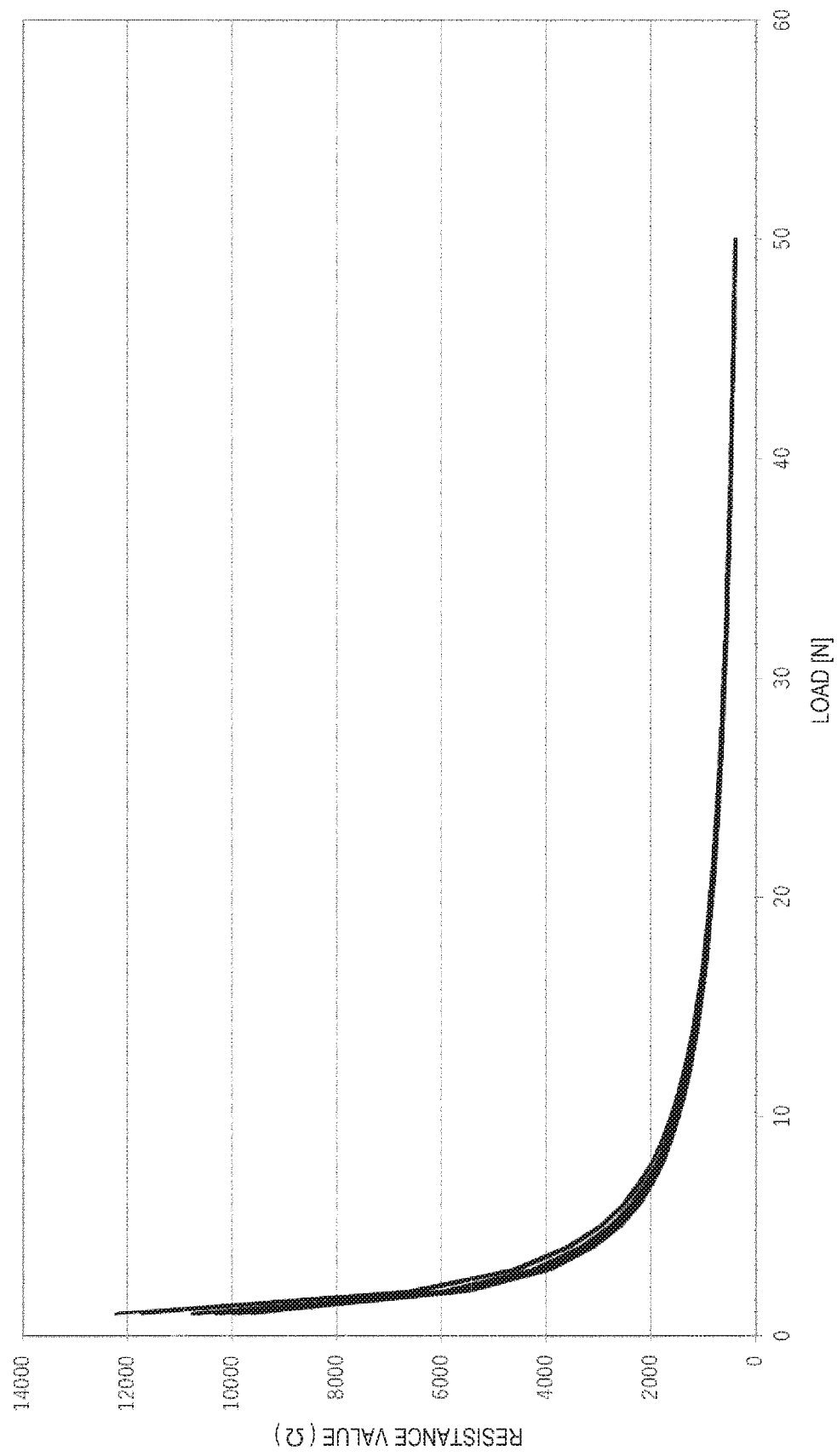
FIG. 13 is a graph showing a variation in resistance value with respect to a load received.
Figure 14:
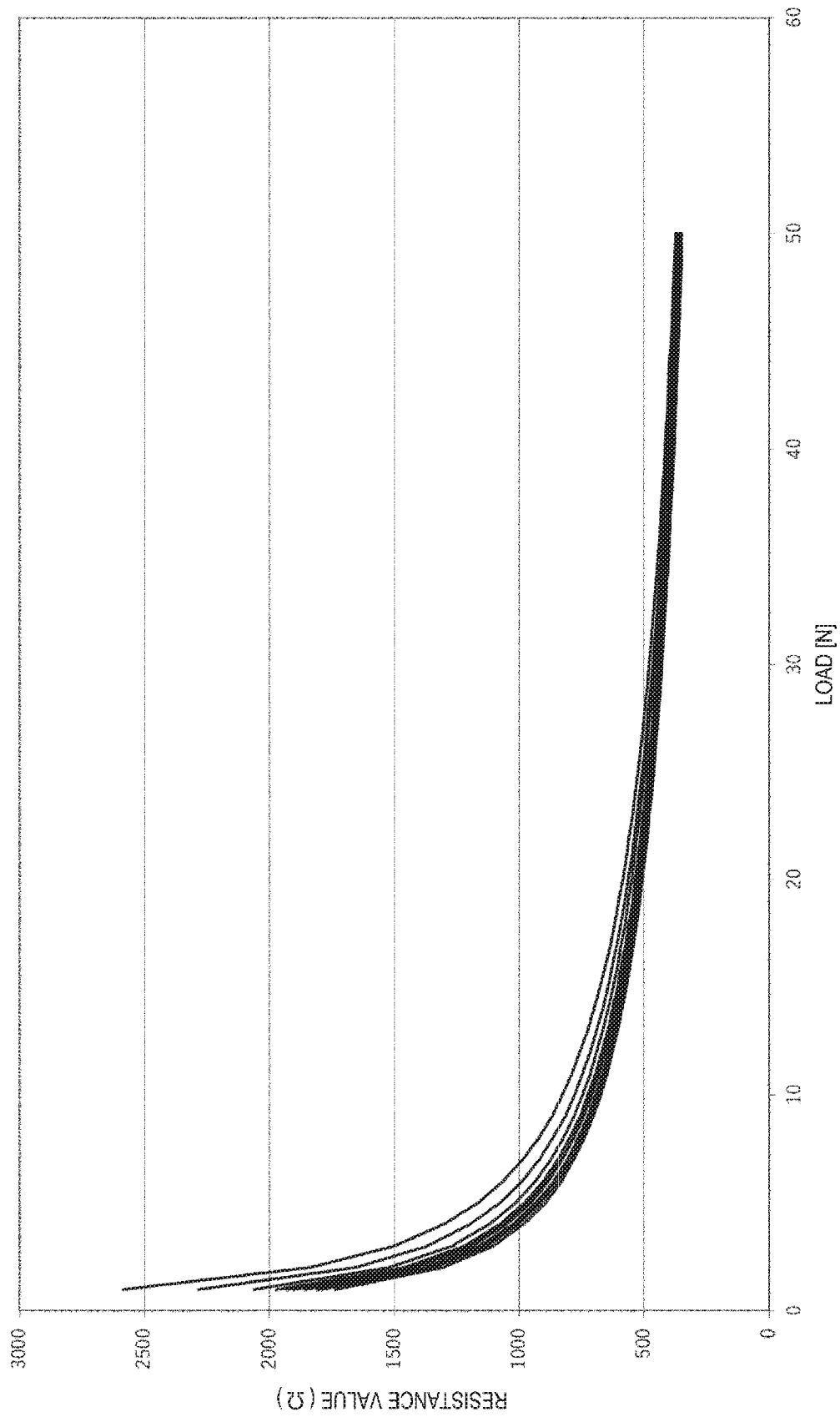
FIG. 14 is a graph showing a variation in resistance value with respect to a load received.

Then, the variation in resistance value with respect to a load received is measured with respect to the comparative example and Practical Example 5 as described below, and then the result is shown in FIG. 13, FIG. 14 and Table 4 described below. FIG. 13 and FIG. 14 each show the result obtained by measuring the resistance value 10 times, and Table 4 shows the maximum variation corresponding to the load of 20 N. It should be noted that FIG. 13 shows the result corresponding to Practical Example 5, and FIG. 14 shows the result corresponding to the comparative example. As is understood from the drawings and the table, Practical Example 5 is sufficiently small in variation in resistance value compared to the comparative example. Therefore, it is understood that it is possible to obtain the pressure-sensitive sensor improved in detection reproducibility compared to the related art as described above.

TABLE 4

| | Variation in resistance value |
|---|---|
| Comparative Example | 14.2% |
| Practical Example 5 | 7.6% |

What is claimed is:

1. A pressure-sensitive sensor comprising:
a first electrode;
a second electrode facing the first electrode to form an overlapped area along a first direction; and
a conductive resin located between the first electrode and the second electrode,
the conductive resin being configured with:
a first region disposed at a center area of the overlapped area, the conductive resin in the first region facing the first and second electrodes via first and second spaces, respectively, along the first direction; and
a second region disposed at a periphery area of the overlapped area, the conductive resin in the second region abutting the first and second electrodes,
wherein the second region surrounds the first region,
the conductive resin continuously radially extends from a center point of the overlapped area to a peripheral circumference of the overlapped area without a gap, and
when viewed along the first direction, an area of the conductive resin is larger than an area of each of the first and second electrodes.

2. The pressure-sensitive sensor according to claim 1, wherein
a thickness of the second region of the conductive resin is thicker than a thickness of the first region of the conductive resin.

3. The pressure-sensitive sensor according to claim 1, wherein
a center of the first electrode is located within the first region of the conductive resin when viewed along the first direction.

4. The pressure-sensitive sensor according to claim 1, wherein
the conductive resin includes a carbon nanotube.

5. The pressure-sensitive sensor according to claim 1, wherein
the first region and the second region of the conductive resin are formed of separate bodies.

6. The pressure-sensitive sensor according to claim 1, wherein
the first region of the conductive resin is circular-shaped when viewed along the first direction.

7. The pressure-sensitive sensor according to claim 1, wherein
the first region of the conductive resin is regular polygonal-shaped when viewed along the first direction.

8. The pressure-sensitive sensor according to claim 1, wherein
the second region of the conductive resin is configured with three or more sub-regions, and
the three or more sub-regions are arranged along a circumferential direction of the first region of the conductive resin, and the three or more sub-regions are spaced apart from each other along the circumferential direction of the first region of the conductive resin.

9. The pressure-sensitive sensor according to claim 1, wherein
a difference between a thickness of the first region of the conductive resin and a thickness of the second region of the conductive resin is larger than a surface roughness of the first region of the conductive resin and a surface roughness of the second region of the conductive resin.

10. A hand comprising:
a manipulator configured to hold an object; and
a base to which the manipulator is fixed via a pressure-sensitive sensor, the pressure-sensitive sensor having:
a first electrode;
a second electrode facing the first electrode to form an overlapped area along a first direction; and
a conductive resin located between the first electrode and the second electrode,
the conductive resin being configured with:
a first region disposed at a center area of the overlapped area, the conductive resin in the first region facing the first and second electrodes via first and second spaces, respectively, along the first direction; and
a second region disposed at a periphery area of the overlapped area, the conductive resin in the second region abutting the first and second electrodes,
wherein the second region surrounds the first region,
the conductive resin continuously radially extends from a center point of the overlapped area to a peripheral circumference of the overlapped area without a gap, and
when viewed along the first direction, an area of the conductive resin is larger than an area of each of the first and second electrodes.

* * * * *